US009164958B2

United States Patent
Tsunoda et al.

(10) Patent No.: US 9,164,958 B2
(45) Date of Patent: Oct. 20, 2015

(54) SIMULATING METHOD FOR KNEADED STATE OF FLUID

(71) Applicant: SUMITOMO RUBBER INDUSTRIES, LTD., Kobe-shi, Hyogo (JP)

(72) Inventors: Masaya Tsunoda, Kobe (JP); Ryosuke Tanimoto, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 352 days.

(21) Appl. No.: 13/688,009

(22) Filed: Nov. 28, 2012

(65) Prior Publication Data

US 2013/0090901 A1    Apr. 11, 2013

(30) Foreign Application Priority Data

Mar. 1, 2012  (JP) .................................. 2012-045867

(51) Int. Cl.
| | |
|---|---|
| *G06F 7/60* | (2006.01) |
| *G06F 17/10* | (2006.01) |
| *G06F 17/50* | (2006.01) |

(52) U.S. Cl.
CPC ............ *G06F 17/10* (2013.01); *G06F 17/5009* (2013.01); *G06F 17/5018* (2013.01); *G06F 2217/16* (2013.01)

(58) Field of Classification Search
CPC ............................ G06F 17/5018; G06T 17/20
See application file for complete search history.

(56) References Cited

PUBLICATIONS

Gracia, L. A., et al. "Finite element simulation of the hysteretic behaviour of an industrial rubber. Application to design of rubber components." Finite Elements in Analysis and Design 46.4 (2010): 357-368.*
Connelly, Robin K., and Jozef L. Kokini. "Mixing simulation of a viscous Newtonian liquid in a twin sigma blade mixer." AIChE journal 52.10 (2006): 3383-3393.*
Bravo et al., "Study of Particle Trajectories, Residence Times and Flow Behavior in Kneading Discs of Intermeshing Co-Rotating Twin-Screw Extruders", Polymer Engineering and Science, vol. 44, No. 4, Apr. 2004, pp. 779-793, XP055073867.
Chen et al., "Numerical analysis of mixing performance of mixing section in pin-barrel single-screw extruder", J Polym Eng, vol. 31, 2011, pp. 53-62, XP09171685.
Connelly et al., "Examination of the mixing ability of single and twin screw mixers using 2D finite element method simulation with particle tracking", Journal of Food Engineering, vol. 79, 2007, pp. 956-969.
Extended European Search Report dated Aug. 13, 2013, for Patent Application No. 12194854.1.

(Continued)

*Primary Examiner* — Aniss Chad
(74) *Attorney, Agent, or Firm* — Birch, Stewart, Kolasch & Birch, LLP

(57) ABSTRACT

Computerized analysis method for estimating a kneaded state of a fluid, comprises: a step of generating a finite element model of a kneading space within which the fluid is kneaded; a step of defining a model of the fluid; a step of defining the fluid model in the kneading space model at a filling rate of less than 100% and defining necessary kneading conditions; a particle tracking step in which, a flow calculation of the fluid model is made, and virtual particles disposed in the fluid model are tracked; an estimating step in which the positional data of the virtual particles are compared with those in an ideal kneaded state of the fluid model, and the degree of kneading of the fluid model is calculated. The ideal kneaded state is calculated in the estimating step, based on existence positions of the fluid model calculated in the particle tracking step.

1 Claim, 14 Drawing Sheets

(56) References Cited

PUBLICATIONS

Kang et al., "Colored particle tracking method for mixing analysis of chaotic micromixers", J. Micromech. Microeng., vol. 14, 2004, pp. 891-899, XP020069706.

Mackerle, "Finite-element analysis and simulation of polymers: a bibliography (1976-1996)", Modeling Simul. Mater. Sci. Eng., vol. 5, 1997, pp. 615-650, XP020072862.

Singh et al., "A simplified approach to compute distribution matrices for the mapping method", Computers and Chemical Engineering, vol. 33, 2009 (Published online Feb. 13, 2009), pp. 1354-1362, XP026160512.

Collin, et al., "Numerical and Experimental Study of Dispersive Mixing of Agglomerates", Society of Plastics Engineers Annual Technical Conference, 2006, ANTEC 2006, 5 pages.

Wang, et al., "Analysis of Dispersive and Distributive Mixing in Terms of Minor Component Size and Spatial Distributions in Continuous Polymer Processing Equipment", Department of Marcomolecular Science Case Western Reserve University, 2001, 16 pages.

* cited by examiner

SIMULATING METHOD FOR KNEADED STATE OF FLUID

BACKGROUND OF THE INVENTION

The present invention relates to a computerized simulating method which is helpful to analyze kneaded states of a fluid.

In order to prepare rubber or resin to be subjected to a cross-linking treatment, the compounding ingredients, namely, polymer material, various additive agents and the like are usually mixed and kneaded by the use of a banbury mixer.

In such kneading process, what is important is that the compounding ingredients are mixed uniformly in a short time. For that purpose, various developments regarding the configurations of the kneading space (chamber) and the rotors therein have been made by the trial-and-error method which requires high development costs.

In recent years, therefore, the use of various computer numerical simulations has been proposed.

For example, in the following non-patent document 1, there has been proposed a numerical simulation for calculating the flow of a plastic material such as unvulcanized rubber and resin before cross-linked, during kneaded by a banbury mixer.

[non-patent document 1] "Numerical and Experimental Study of Dispersive Mixing of Agglomerates", V. Collin (1)*, E. Peuvrel-Disdier (1) et al.

In the following non-patent document 2, it has been proposed to quantitatively get a grasp of kneaded states of a plastic material through a numerical simulation, wherein the current kneaded state is compared with an ideal uniform kneaded state and quantified.

[non-patent document 2] "Analysis of Dispersive and Distributive Mixing In Terms of Minor Component Size and Spatial Distributions In Continuous Polymer Processing Equipment", Winston Wang and Ica Manasloczower In the method of the non-patent document 2, the ideal uniform kneaded state is defined such that the chamber or kneading space is completely filled with the plastic material, namely, the filling rate is 100%.

In the actual kneading process, however, the filling rate is less than 100%. Therefore, the ideal kneaded state defined in the non-patent document 2 does not represent a correct ideal kneaded state.

For example, if the filling rate is decreased, then the percentage of the plastic material resting near the interior surface of the kneading space becomes high in comparison with that at the filling rate of 100%. Namely, if the filling rate is decreased, the ideal kneaded state should be altered according thereto such that the plastic material shifts toward the interior surface.

Therefore, based on the assumption of the non-patent document 2 that the ideal kneaded state is independent of the filling rate, there is a possibility that the dispersion state is evaluated as becoming worse with the decrease in the filling rate.

SUMMARY OF THE INVENTION

Therefore, in order to solve the above-mentioned problems, the present invention was studied out, and an object of the present invention is to provide a computerized simulating method by which it is possible to accurately estimate kneaded states of a plastic material, and thereby the efficiency of developing kneading machines and the like can be improved.

According to the present invention, a computerized simulating method for estimating a kneaded state of a fluid, comprises:

a step of generating a kneading space model which is a finite element model of a kneading space within which the fluid is kneaded;

a step of defining a fluid model of the fluid;

a step of defining the fluid model in the kneading space model at a filling rate of less than 100% and defining necessary kneading conditions;

a particle tracking step in which, a flow calculation of the fluid model is made based on the kneading conditions, and virtual particles disposed in the fluid model are tracked;

an estimating step in which the positional data of the virtual particles are compared with those in an ideal kneaded state of the fluid model, and the degree of kneading of the fluid model is calculated; wherein the ideal kneaded state is calculated in the estimating step, based on existence positions of the fluid model calculated in the particle tracking step.

Further, the method according to the invention may includes the following features:

the particle tracking step includes
a step in which a plurality of first virtual particles are arranged in the kneading space model,
a step in which the first virtual particles are moved based on the physical quantity of the fluid model, and
a step in which the positional data of the first virtual particles are stored;

the estimating step includes
a step in which a plurality of second virtual particles are randomly/uniformly and fixedly arranged in the kneading space model,
a step in which positions at which the current fluid model resides are calculated from the positions tracked in the particle tracking step, and
a step in which the ideal kneaded state is defined based on the second virtual particles residing at the existence positions of the fluid model; and the estimating step further includes
a step in which the degree of kneading of the fluid model is calculated on the basis of the degree of coincidence between the arrangement of the first virtual particles and the arrangement of the second virtual particles.

Therefore, the kneaded states of the fluid is estimated accurately quantitatively through the method without actually manufacturing kneading machines experimentally. Thus, the development efficiency can be greatly improved.

DESCRIPTION OF THE PREFERRED EMBODIMENTS

Embodiments of the present invention will now be described in detail in conjunction with accompanying drawings.

The present invention is directed to an analysis method for estimating kneaded states of a fluid by the use of a computer (not shown).

Figure 1:
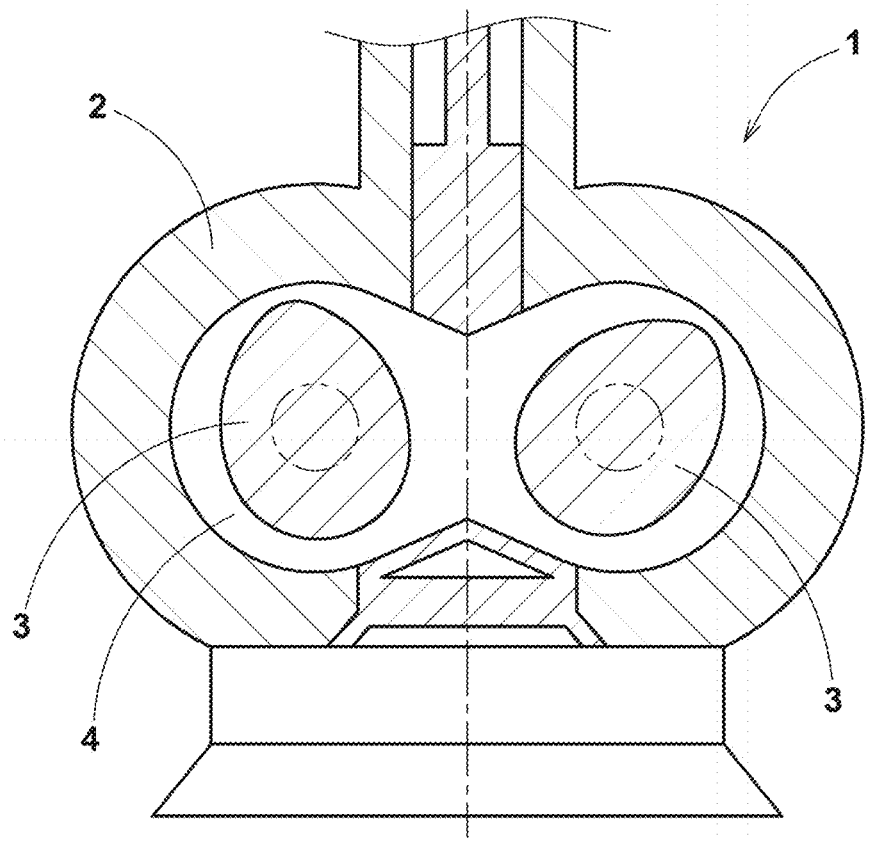
FIG. 1 is a schematic cross sectional view of a principal part of a banbury mixer for kneading a plastic material.

For example, before molding a rubber material or resin material, kneading is carried out. During kneading, the primary materials, e.g. chemicals, fine particles and the like get wet with a liquid binder and are dispersed uniformly into uniform mixture. Such kneading process is typically performed by a banbury mixer 1 as shown in FIG. 1.

The banbury mixer 1 comprises
a casing 2 defining an interior surface of a kneading space 4 in which primary materials, e.g. rubber materials or the like are kneaded, and
a pair of rotors 3 rotatable within the kneading space 4.

The kneading space 4 in this example has a sectional shape like a figure eight. The kneading space is however, not limited to such configuration.

The fluid in this embodiment is a plastic material having viscosity like uncured rubber before cross-linked. The fluid is however, not limited to uncured rubber, resin, elastomer and the like having plasticity. The fluid may be any material as far as it has a stable fluidized state. In the case of uncured rubber before cross-linked, a state of the mixture kneaded in good part at around 80 degrees C. may be regarded as a stable fluidized state.

Figure 2:
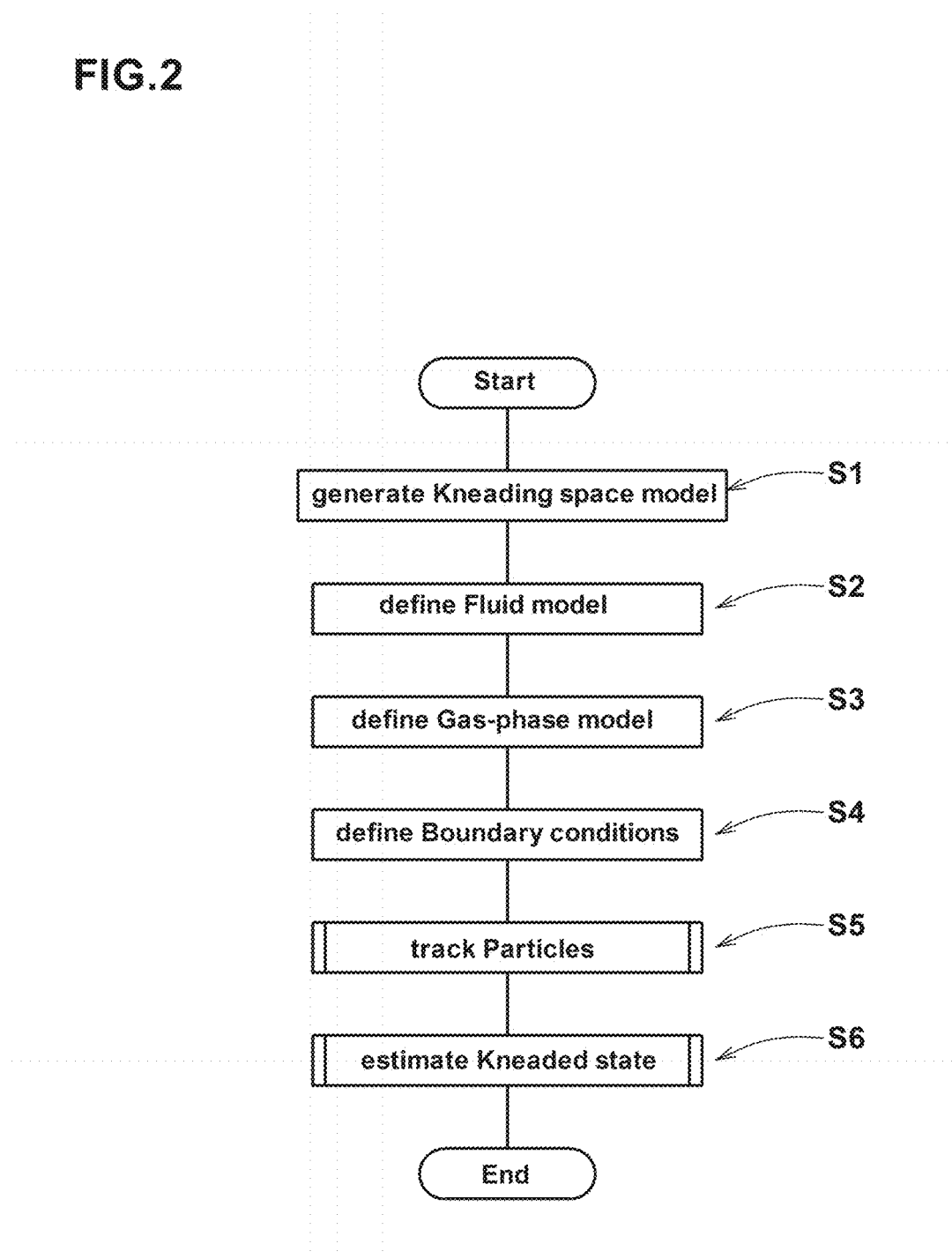
FIG. 2 is a flow chart showing a simulating method as an embodiment of the present invention.

FIG. 2 shows a flow chart of the method as an embodiment of the present invention.

According to this flow chart, the method is described hereunder.

* Step S1 of Generating Kneading Space Model

First, a kneading space model 5, which is a finite element model of the kneading space 4 made up of a finite number of elements (e) or cells, is generated by the computer and stored.

Figure 3:
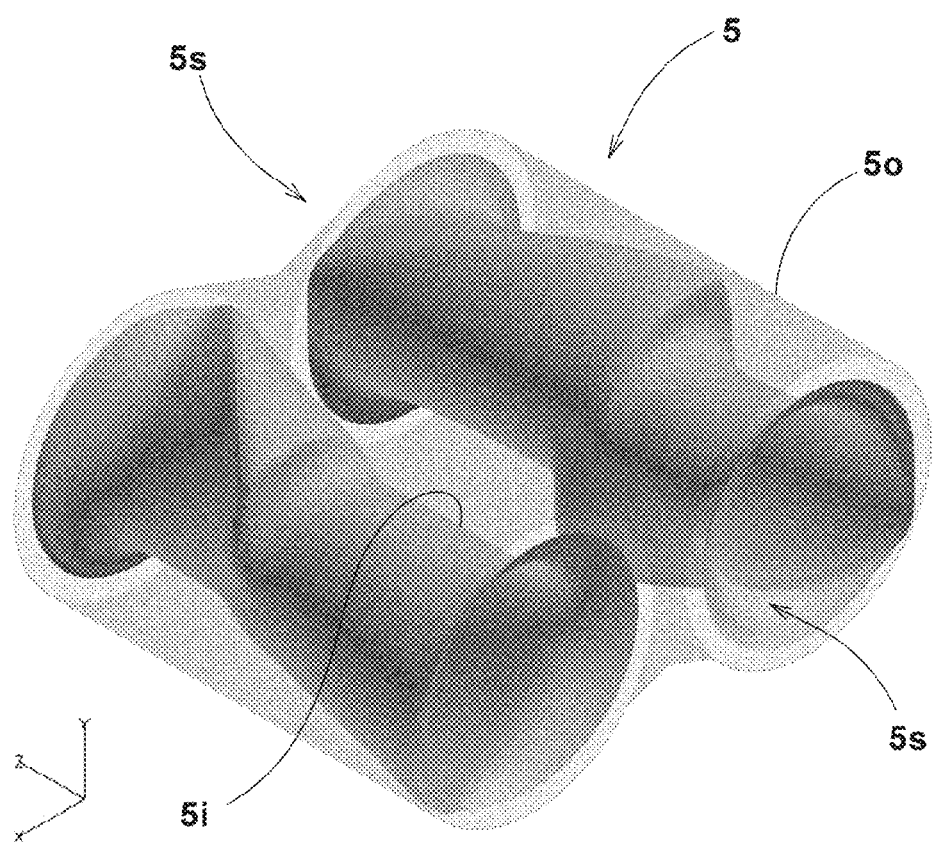
FIG. 3 is a perspective view of a kneading space model.
Figure 4:
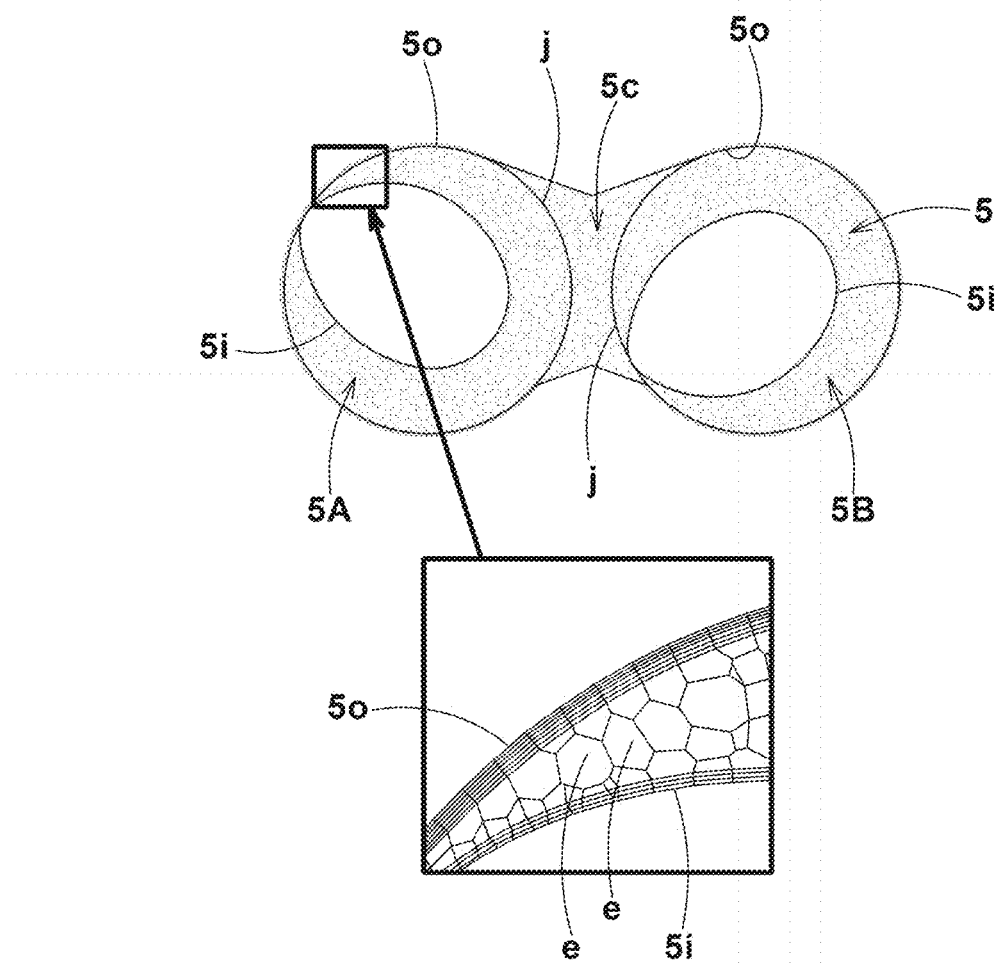
FIG. 4 is a cross sectional view of the kneading space model.

FIG. 3 shows a perspective view of the kneading space model 5. FIG. 4 shows a cross sectional view of the kneading space model 5. As shown, the kneading space model 5 corresponds to a three-dimensional closed space enclosed by
an outside circumference surface 5o defined by the interior surface of the casing 2,
an inside circumferential surface Si defined by the outer circumference surfaces of the two rotating rotors 3, and
two end surfaces 5s on both sides of the rotors 3 in the axial direction.

This three-dimensional closed space is divided (discretized) into the three-dimensional elements (e) such as tetrahedral elements, hexahedral elements and polyhedral elements, as Euler elements (e). For each element, physical quantities of the fluid such as pressure, temperature and/or velocity are computed.

The outside circumference surface 5o and the two end surfaces 5s are not moved. However, the inside circumferential surface 5i is moved according to the rotation of the rotors 3, and accordingly, the configuration of the kneading space model 5 is changed.

Figure 5:
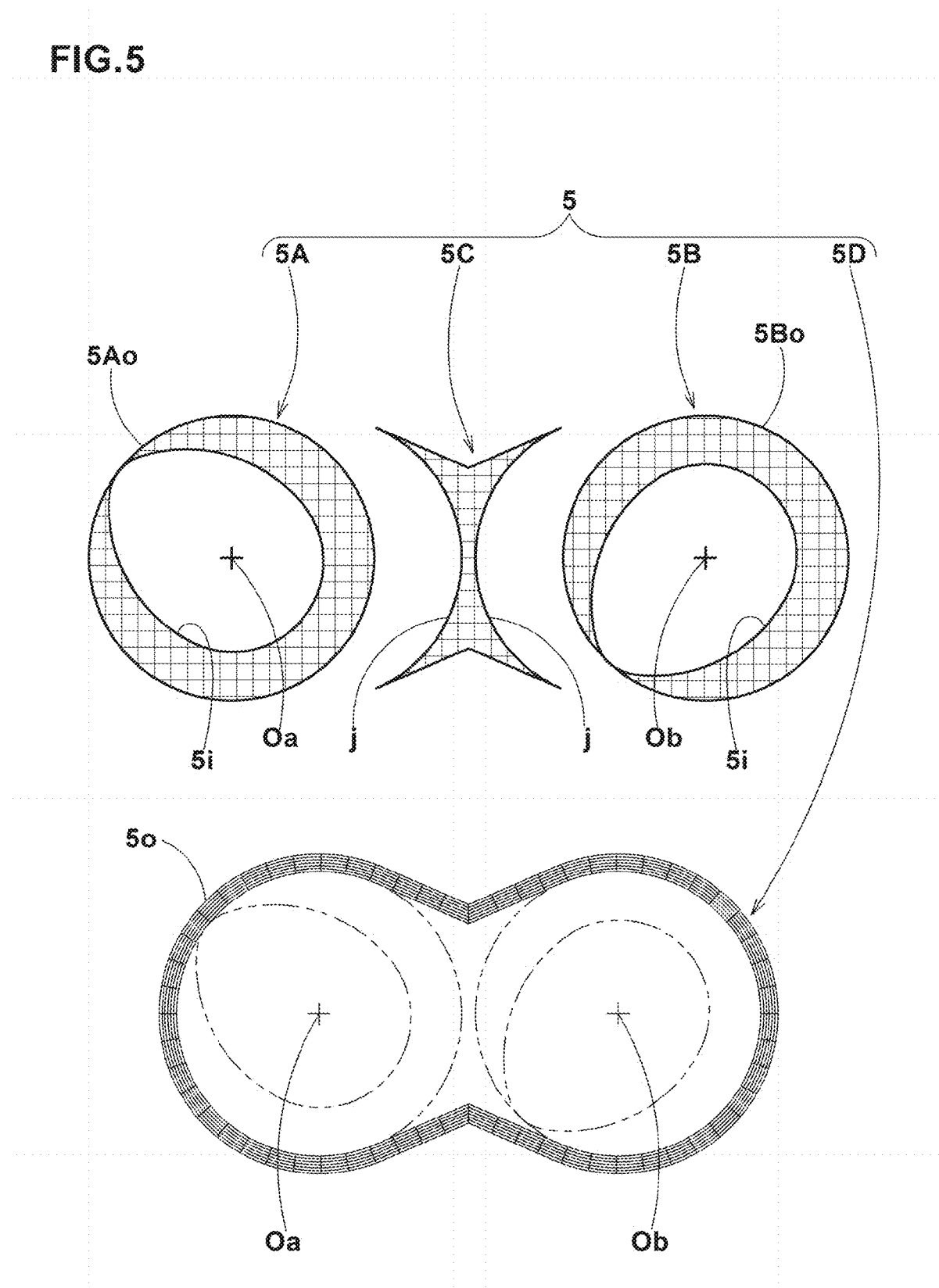
FIG. 5 is a cross sectional view showing functional parts of the kneading space model separately.

In the example shown in FIG. 5, the kneading space model 5 is composed of four functional parts: a pair of rotative parts 5A and 5B, an in-between part 5C sandwiched therebetween, and an outer frame part 5D surrounding these parts 5A, 5B and 5C.

Each rotative part 5A/5B is tubular and has a cylindrical circumference surface 5Ao/5Bo and an inside circumferential surface 5i corresponding to the circumference surface of one rotor 3.

The rotative parts 5A and 5B are placed in the outer frame part 5D and defined as rotatable around the respective center axes Oa and Ob to represent the change in the configuration of the volume of the kneading space 3 caused by the rotations of the rotors 3.

In contrast, the in-between part 5C remains at rest between the rotative parts 5A and 5B, and has two concave surfaces j abutting on the respective rotative parts 5A and 5B. on the concave surfaces j and the respective cylindrical circumference surfaces 5Ao and 5Bo, boundary conditions as sliding surface are defined. This allows physical actions (force, heat, etc.) occurring in the rotative parts 5A and 5B to be transferred to the fluid model existing in the in-between part Sc through the concave surfaces j.

The outer frame part 5D is tubular and surrounds the rotative parts 5A and 5B and the in-between part 5C. Both of the axial ends thereof are closed by the two end surfaces 5s.

On the interface between the outer frame part 5D and the rotative parts 5A and 5B, and also on the interface between the outer frame part 5D and the in-between part 5C, boundary conditions as sliding surface are defined. This allows physical actions (force, heat, etc.) occurring in the rotative parts 5A and 5B to be transferred to the outer frame part 5D through the interfaces therebetween.

The outer frame part 5D is subjected to a relatively large shearing force by the operation of the rotors. Therefore, in order to calculate the velocity and the like of the material in more detail, it is preferred that the elements constituting the outer frame part 5D are made smaller in size than those of the rotative parts 5A and 5B and the in-between part 5C. Thereby, velocity profile and the like of the fluid model near the interior surface of the kneading space model 5 can be calculated in more detail.

* Step S2 of Defining Fluid Model

Next, a fluid model is defined by the computer and stored. The fluid model is a model of the fluid flowing or moving in the kneading space 4.

On the fluid model, physical properties of the fluid such as shear viscosity, specific heat, thermal conductivity and specific gravity are defined and stored in the computer. As described above, the fluid in this embodiment is a rubber mixture in a plasticized state, therefore, physical properties of such rubber mixture are entered and stored in advance.

As to the shear viscosity, viscoelastic properties G' and G" of the analysis object (plastic material) are measured under a plurality of temperature conditions, and the shear viscosity is obtained by converting the viscoelastic properties according to the Cox-Merz rule.

The shear viscosity η obtained as above is approximated by the following expression (1) according to a power law.

$$\eta = m\gamma'^{n-1} \qquad \text{Expression (1)}$$

wherein,
m: a coefficient as a function of absolute temperature T,
γ': a shear velocity,
n: a coefficient.

The specific heat of the analysis object (plastic material) can be obtained by the thermally-insulated continuous-heating method (@ 25 degrees C.), and the measured specific heat value is entered and stored in the computer in advance.

The thermal conductivity of the analysis object (plastic material) can be obtained by the hot wire method (@ 25 degrees C.), and the measured value is entered and stored in the computer in advance.

\* Step S3 of Defining Gas-Phase Model

Next, a gas-phase model is defined by the computer and stored. The gas-phase model is a model of gas existing in the kneading space.

In the present invention, the filling rate of the fluid model in the kneading space model 5 is less than 100%, therefore, in order to enable flow calculations, the part not filled with the fluid model, is filled with the gas-phase model.

On the gas-phase model, viscosity and specific gravity of the gas are defined and stored in the computer.

\* Step S4 of Defining Boundary Conditions

Next, various conditions necessary for carrying out the flow calculation such as boundary conditions are defined.

The boundary conditions include flow velocity boundary conditions and temperature boundary conditions at the surface of the kneading space model 5.

As to the flow velocity boundary conditions,
(a) wall-surface non-slip condition or
(b) wall-surface slip condition
is defined according to the purpose of the simulation, required accuracy and the like.

In the case of the wall-surface non-slip condition, the flow velocity of the fluid model at the surface of the kneading space model 5 is always zero.

In the case of the wall-surface slip condition, the flow velocity of the fluid model at the surface of the kneading space model 5 may have non-zero values as well as zero value. In this case, slip phenomena at the interface between the fluid model and the kneading space model 5 can be simulated according to the Navier's Law.

As to the temperature boundary conditions,
(a) thermally insulated condition in which the heat does not escape outside from the kneading space model 5 through the surface thereof, or
(b) condition in which the entire surface of the kneading space model 5 has a constant temperature (for example 50 degrees C.) may be defined according to the purpose of the simulation, required accuracy and the like.

Further, the conditions may include the initial temperature of the fluid model, the number of rotations of the rotors presented by the number of rotations of the rotative parts 5A and 5B, the slip ratio of the surface of the kneading space model 5, the filling rate (less than 100%) of the fluid model with respect to the volume of the kneading space model 5 and the like.

Furthermore, the conditions may include an initial state of the flow calculation, time intervals for calculations, the number of iterations in the internal processing, the maximum period of computation (iteration) and the like.

In addition, kinds of parameters which are output as a result of the simulation are defined.

Figure 6:
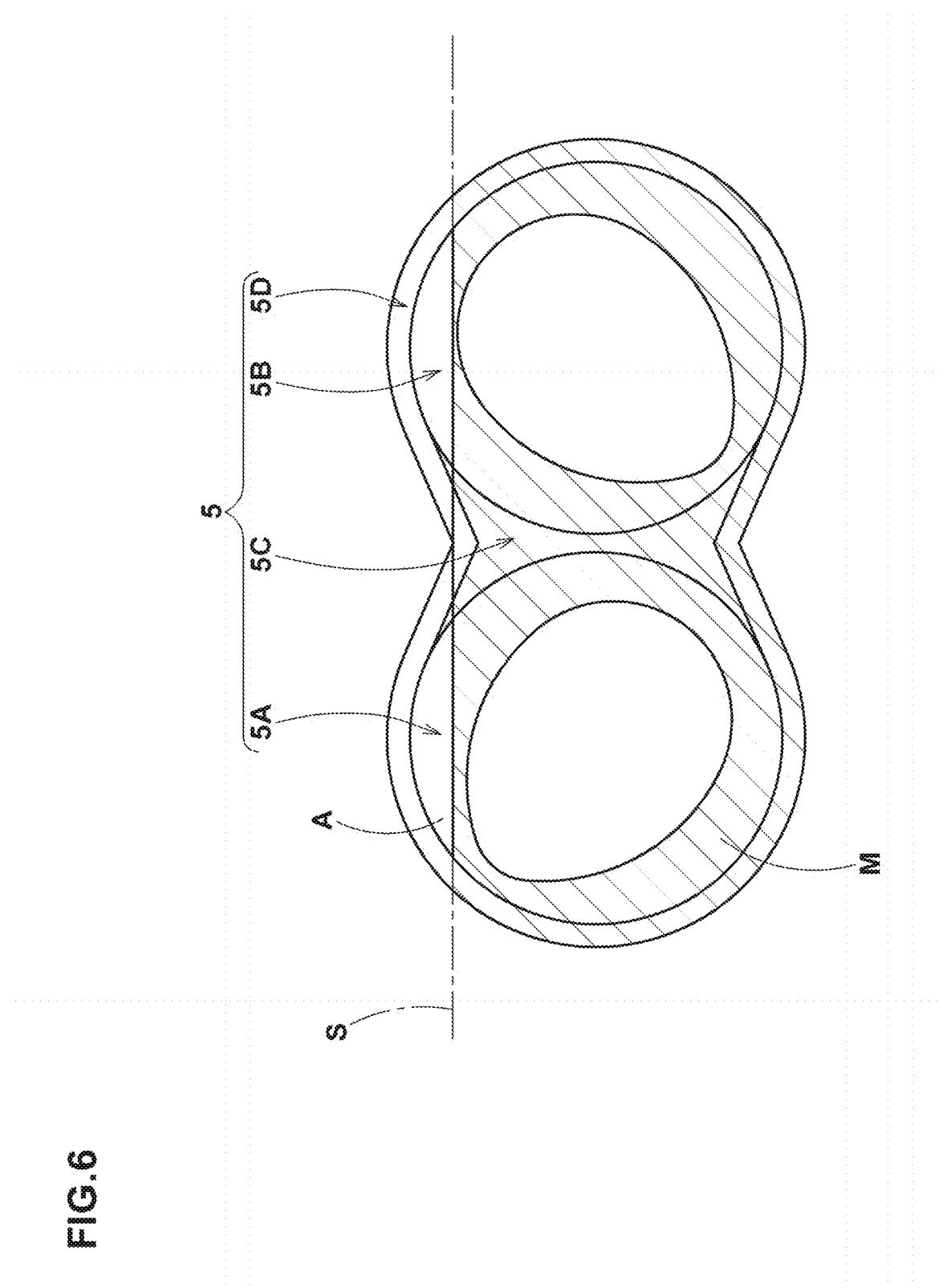
FIG. 6 is a cross sectional view showing a state of the kneading space model in which a fluid model and a gas-phase model are arranged.

As the initial state, for example as shown in FIG. 6, it is possible to define such that the domain A on the upper side of a horizontal interface S defined as extending across the kneading space model 5 is of the gas-phase model, and the domain M on the under side of the horizontal interface S is of the fluid model. Therefore, by changing the level of this interface S, the filling rate of the fluid model can be adjusted.

\* Step S5 of Tracking Particles

Next, a particle tracking step S5 is carried out.

Figure 7:
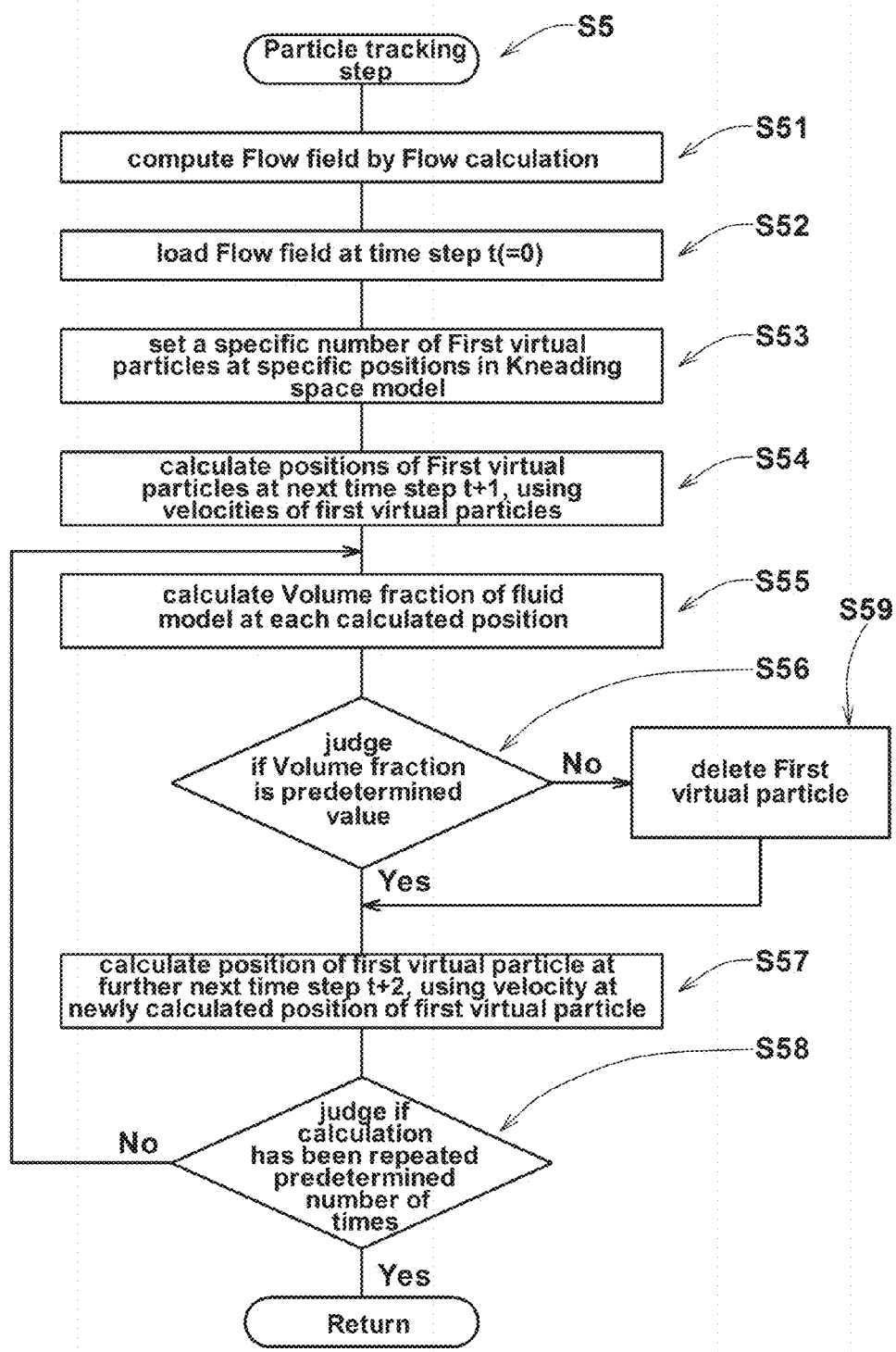
FIG. 7 is a flow chart of an example of the particle tracking step.

FIG. 7 shows the flow chart of an example of the particle tracking step S5.

\*\* Step S51

In the particle tracking step, firstly, the computer performs a flow calculation using the kneading space model 5 and the fluid model, according to the kneading conditions.

The flow calculation can be made by the use of a general-purpose fluid analysis software.

By the flow calculation, for each of the elements of the kneading space model 5, velocity components in three coordinate axes directions (x, y, z) specifying the motional state of the fluid, and the temperature T and pressure p specifying the internal state of the fluid are obtained. Thus, these five physical quantities are unknowns to be solved. Thereby, the flow field is computed.

\*\* Step S52

Next, the computer loads the flow field at a time step t which have been computed by the flow calculation.

The "flow field" is a field in which physical quantity such as velocity, pressure and density—by which the flow of the fluid in a certain domain (in this case, the kneading space model) at an arbitrary time can be specified—have been determined.

\*\* Step S53

Next, the computer sets or defines a specific number of first virtual particles at specific positions within the kneading space model 5.

In the numerical simulation, the first virtual particle is treated as a virtual particle having no dimension and no mass and exerting no influence on the flow calculation of the fluid model and further being movable according to the flow of the fluid model.

Therefore, by the use of the positional data of the first virtual particles, it is possible to track the first virtual particles and thereby to know the fluidized state of the fluid model.

In order to know the degree of the kneading (dispersion) of the fluid model, it is preferred that the number of the first virtual particles is at least a few hundred, more preferably five hundred or more. The positions of the first virtual particles may be set arbitrarily within the kneading space model 5. The number and positions are defined beforehand in the step S4 of defining the boundary conditions.

\*\* Step S54

Next, from the data about the velocities of the first virtual particles, the computer calculates the positions of the first virtual particles at the next time step t+1.

Figure 8:
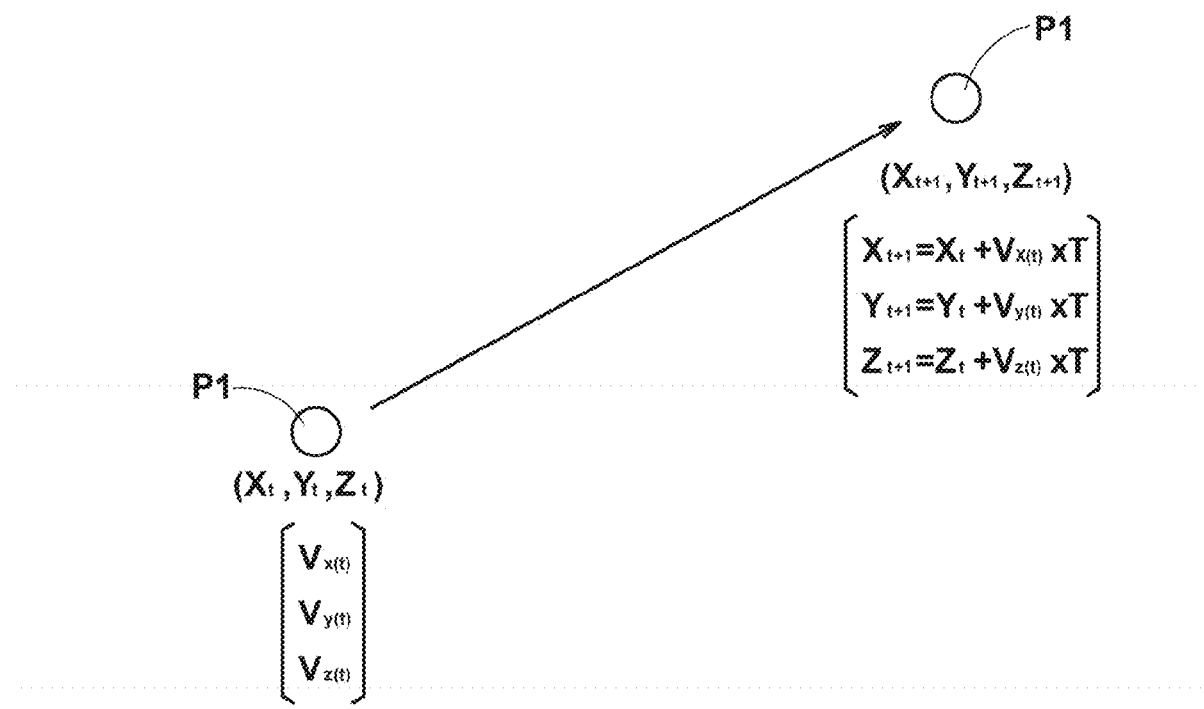
FIG. 8 is a diagram for explaining the particle tracking.
Figure 9:
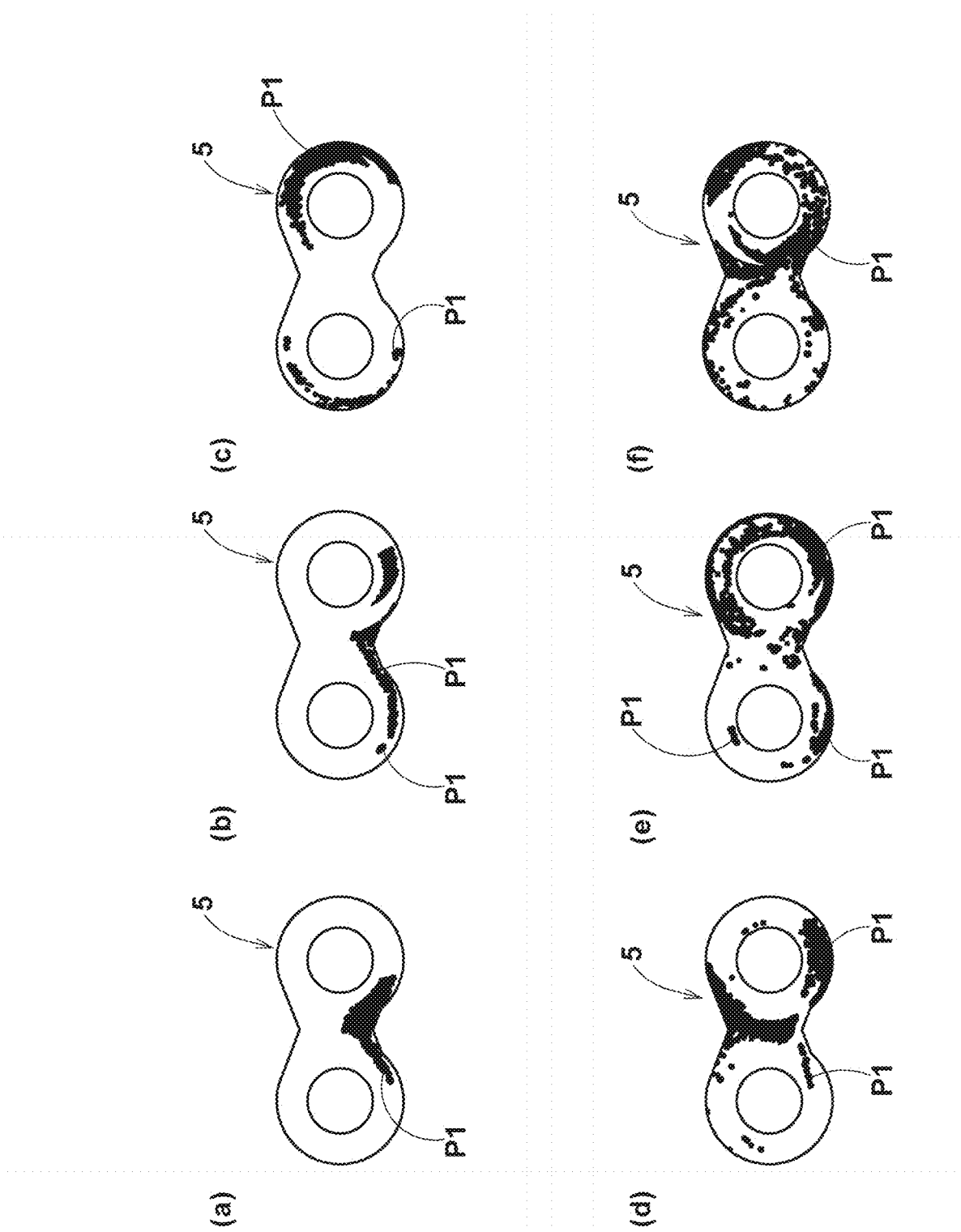
FIGS. 9(a)-9(f) are visualization of the tracked particles' positions, wherein the motions thereof are shown in chronological order.

This calculation is, as shown in FIG. 8, performed as follows. In FIG. 8, only one of the first virtual particles P1 is illustrated. However, the computer performs the following process for each of the first virtual particles.

At the time step t, the first virtual particle P1 is at a position (Xt, Yt, Zt).

In the flow field at the time step t, the fluid model at a position (Xt, Yt, Zt) has a velocity whose x, y and z components are Vx(t), Vy(t) and Vz(t), respectively.

The computer calculates the position (Xt+1, Yt+1, Zt+1) of the first virtual particle P1 at the next time step t+1, using the following expressions:

$$Xt+1 = Xt + Vx(t) \times T,$$

$$Yt+1 = Yt + Vy(t) \times T, \text{ and}$$

$$Zt+1 = Zt + Vz(t) \times T$$

wherein
T=the time interval between the time step t and the time step t+1.
** Step S55

Next, the computer calculates the volume fraction of the fluid model at the calculated position (Xt+1, Yt+1, Zt+1).

In the present invention, it is necessary to simultaneously deal with the two kinds of fluid which are the gas-phase model and the fluid model existing in the kneading space model 5. For this purpose, in this embodiment, the VOF (volume of Fluid) method, which is used to calculate a flow with a free interface, is employed. The VOF method does not directly calculate the motion of the interface between two kinds of fluid. In the VOF method, a free interface is expressed by defining a volume fraction which corresponds to a filling rate of the fluid model within the volume of each element of the kneading space model 5.

Accordingly, if the volume fraction of the fluid model about an arbitrary element is 0, this means that the entire volume of the element is filled with the gas-phase model.

If the volume fraction of the fluid model about an arbitrary element is 1 (=maximum value, filling rate=100%), this means that the entire volume of the element is filled with the fluid model.
** Step S56

Next, the computer judges whether or not the above-mentioned volume fraction is not less than a predetermined value for example around 0.5.

Thus, "YES" means that a fluid model substantially exists at a position to which the first virtual particle is moved at the next time step t+1.

"NO" means that a fluid model substantially does not exist at the position.
** Step S57

If the result in the step S56 is "YES", from the data about the velocity at the newly calculated position of the first virtual particle, the computer calculates the position of the first virtual particle at the further next time step t+2.
** Step S59

If the result in the step S56 is "NO", the computer deletes the first virtual particle concerned. In other words, with respect to the concerned first virtual particle moved into the gas-phase model, the computer ends the tracking.
** Step S58

Next, the computer judges whether or not the above-explained process has been repeated a predetermined number of times. This number is determined based on whether the elapsed time of the tracking of the first virtual particle is sufficient or not.

If the result in the step S58 is "NO", the computer again performs the step S55 and subsequent steps.

If the result in the step S58 is "YES", the computer performs an estimating step S6 as shown in FIG. 2. At this moment, the current number of the time step is L.

FIGS. 9(a)-9(f) show results of the particle tracking step S5, wherein motions of the first virtual particles P1 (indicated by black dots) are shown in chronological order. As shown, it is well simulated that the first virtual particles are dispersed with the progress of kneading.
** Step S6

In the estimating step S6, the computer calculates the degree of kneading of the fluid model by comparing the positional data of the first virtual particles with an ideal kneaded state of the fluid model in the kneading space model 5.

The ideal kneaded state is calculated based on the existence positions of the fluid model calculated in the particle tracking step S5.

Figure 10:
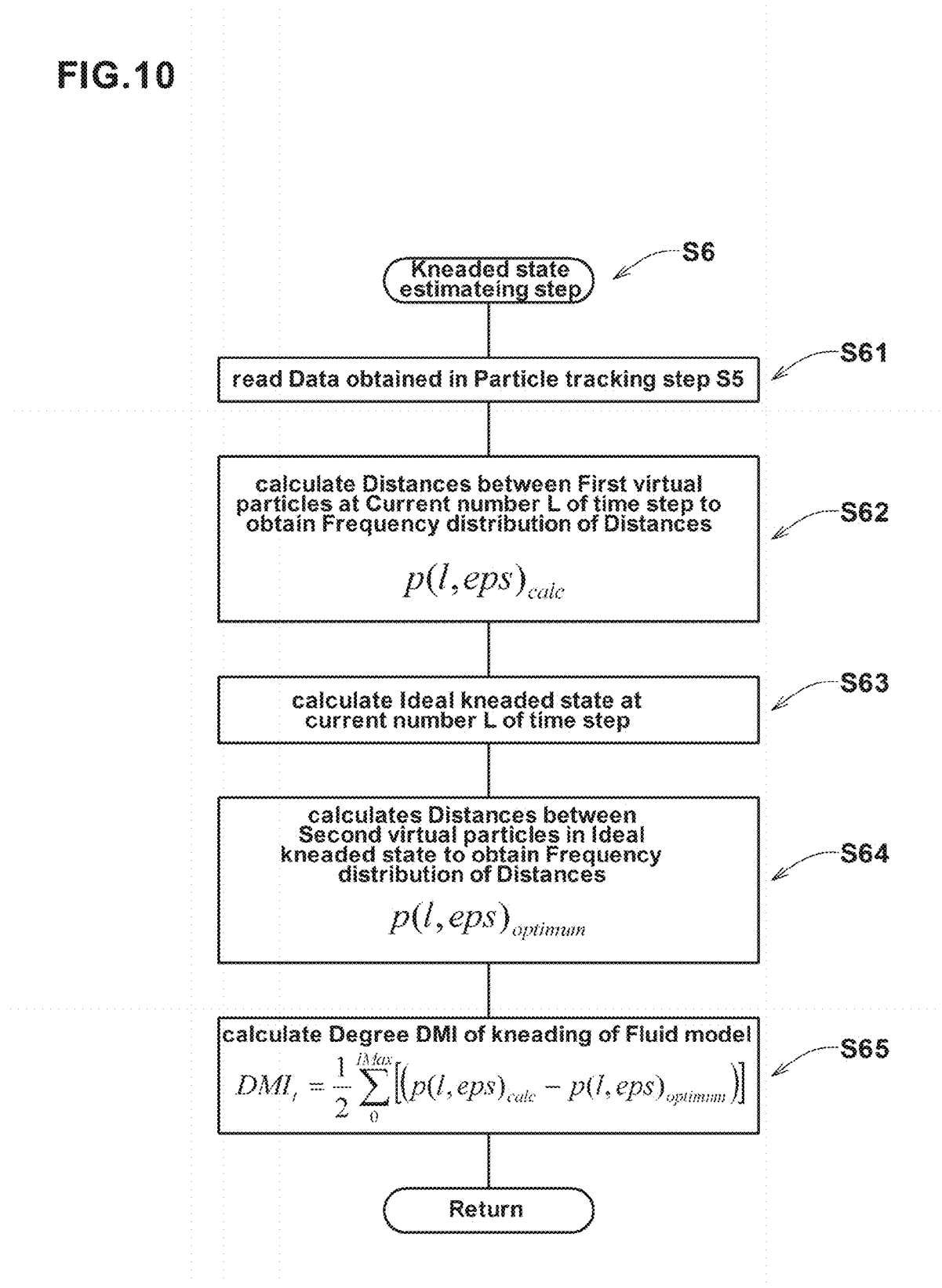
FIG. 10 is a flow chart an example of the estimating step.

FIG. 10 shows a flow chart of the estimating step S6 performed by the computer.
** Step S61

In the estimating step, firstly, the computer reads the data obtained in the particle tracking step S5 into the memory. The read data include the three-dimensional coordinates and velocities of the respective first virtual particles.
** Step S62

Next, the computer calculates distances between the first virtual particles at the current number L of the time step and then calculates the frequency distribution of the distances.

Figure 11:
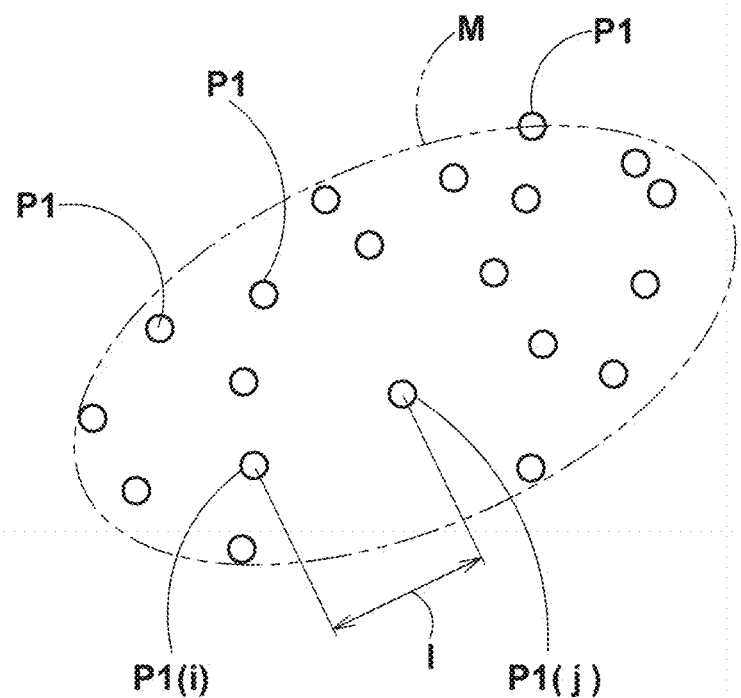
FIG. 11 is a diagram for explaining the distance between particles.

In FIG. 11, a plurality of the first virtual particles included in an arbitrary domain of the fluid model M are indicated by circles.

In the step S62, the distances are computed with respect to every combinations of the first virtual particles tracked in the kneading space model 5.

Figure 12:
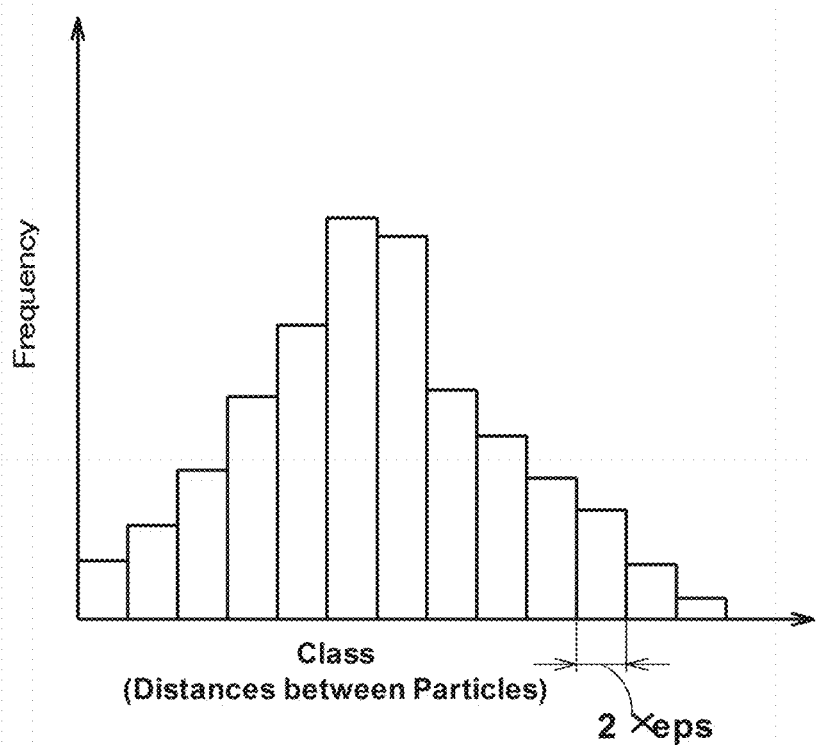
FIG. 12 is a histogram showing a frequency distribution of the distances between the particles.

FIG. 12 is a histogram showing the frequency distribution, wherein the vertical axis denotes the frequency, and the horizontal axis denotes the class corresponding to the distance between the particles.

The frequency distribution can be given by the following expression 2.

$$p(l, eps)_{calc} = \frac{1}{N(N-1)} \sum_{i=1}^{N} \left[ \sum_{j=1}^{N} \varphi_{ij} \right] \quad \text{Expression 2}$$

wherein
"p" is a function expressing a probability,
"eps" is ½ of the class interval width of the class (distance between particles) for obtaining the frequency distribution,
"N" is the number of the first virtual particles,
i and j are indexes specifying the first virtual particles,
"l" is a distance between two first virtual particles i and j,
$\varphi_{ij}$ is a variable whose value is 1 or 0. If i≠j and there is a particle between l-eps and l+eps, then the variable $\varphi_{ij}$=1. If i=j, then the variable $\varphi_{ij}$=0.
The suffix "calc" means the actual kneaded state.
** Step S63

Next, the computer calculates an ideal kneaded state at the current number L of the time step.

In this step S63, firstly, aimed at the entire domain of the three-dimensional space of the kneading space model 5, the computer uniformly fixedly arranges a plurality of second virtual particles within the kneading space model 5.

In the numerical simulation, the second virtual particle is treated as a virtual particle having no dimension and no mass and exerting no influence on the flow calculation.

The uniform arrangement of the second virtual particles may be generated by utilizing a random function for example.

The number of the second virtual particles may be arbitrarily determined. However, it is desirable that the number is set in a comparable range to the first virtual particles.

Next, from the calculated result of the particle tracking step S5, the computer calculates fluid positions or the positions at which the current fluid model exists. Specifically, for each element of the kneading space model 5, the volume fraction of the fluid model is calculated.

If the volume fraction is not less than a predetermined threshold (for example 50%), it is judged that the current fluid model exists at the position of the element concerned.

Next, based on only the second virtual particles which reside at the fluid positions obtained in the above-mentioned step, the computer defines the ideal kneaded state. Specifically, the computer deletes all of the second virtual particles not residing at the fluid positions, if any. Accordingly, only the second virtual particles residing at the fluid positions are remained.

By the above-mentioned step, the computer can obtain an optimum kneaded state (uniformly dispersed state) for the positions where the current fluid model exists.

** Step S64

Next, with respect to the second virtual particles in the ideal kneaded state calculated in the above-mentioned step, the computer calculates the distances between the second virtual particles and then calculates the frequency distribution of the distances.

In this step, the distances between the particles are computed with respect to every combinations of the second virtual particles residing at the fluid positions in the kneading space model 5.

The frequency distribution is given by the following expression 3.

$$p(l, eps)_{optimum} = \frac{1}{N(N-1)} \sum_{i=1}^{N} \left[ \sum_{j=1}^{N} \varphi_{ij} \right]$$

Expression 3 wherein the symbols used herein are the same as those in the expression 1, but "first virtual particle" shall be replaced with "second virtual particle."

The suffix "optimum" means the ideal kneaded state.

**Step S65

Next, the computer calculates the degree of kneading of the fluid model by comparing the positional data of the first virtual particles with the positional data of the second virtual particles in the ideal kneaded state.

In this embodiment, the degree of kneading of the fluid model is calculated on the basis of the degree of coincidence between the arrangement of the first virtual particles and the arrangement of the second virtual particles.

Thus, the degree of kneading DMI is given by the following expression 4.

$$DMI_t = \frac{1}{2} \sum_{0}^{lMax} [(p(l, eps)_{calc} - p(l, eps)_{optimum})]$$

Expression 4

Figure 13:
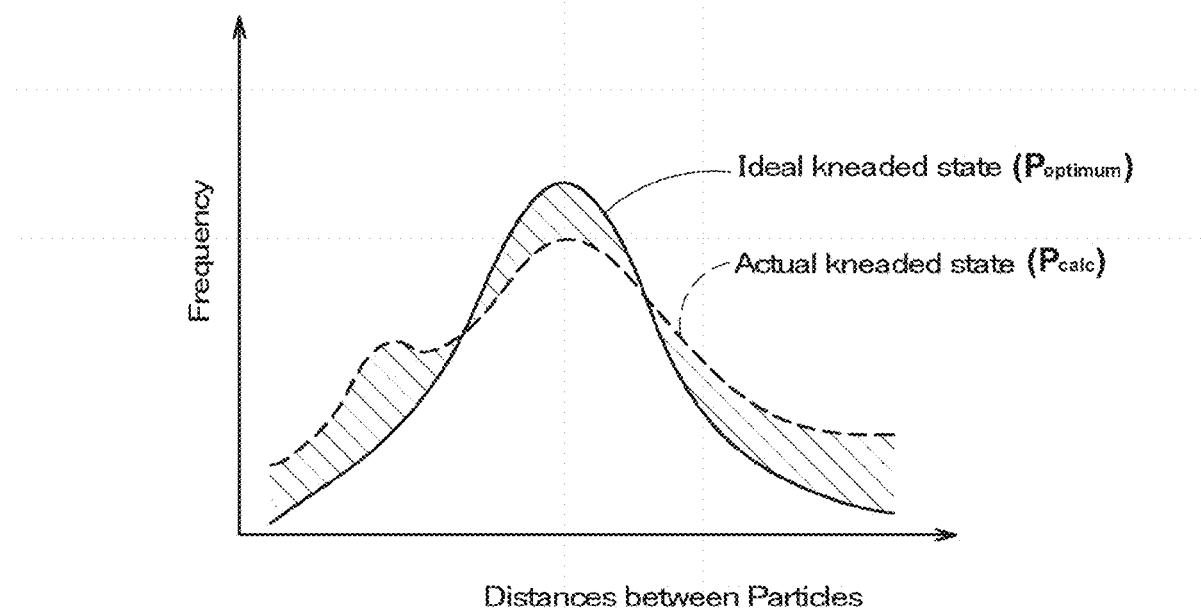
FIG. 13 is a histograms showing a frequency distribution of the distances between particles in an actual kneaded state, and that in an ideal kneaded state.

In the expression 3, the DMI is obtained as the difference between the frequency distribution (probability function $p_{optimum}$) of the ideal kneaded state calculated from the distances between the second virtual particles, and the frequency distribution (probability function $p_{calc}$) of the actual kneaded state calculated from the distances between the first virtual particles as schematically shown in FIG. 13. Accordingly, with a decrease in the DMI, the actual kneaded state becomes closer to the ideal kneaded state.

As explained above, according to the present invention, kneaded states of a fluid model of a plastic material can be obtained by making a numerical simulation.

Since a current kneaded state of the fluid model is compared with its ideal kneaded state, it is possible to quantitatively get a grasp of the current kneaded state.

In particular, according to the present invention, since the ideal kneaded state of the fluid model is calculated based on the existence positions of the fluid model calculated in the particle tracking step S5, it is possible to accurately quantitatively estimate the ideal kneaded state and consequently the kneaded state of the fluid.

Figure 14A:
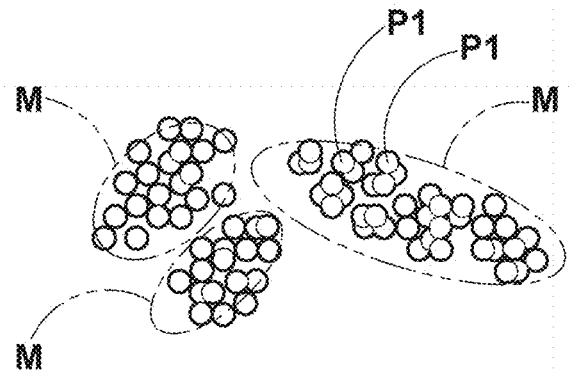
FIG. 14(a) is a diagram showing first virtual particles in an actual kneaded state obtained by the particle tracking step of the present invention.
Figure 14B:
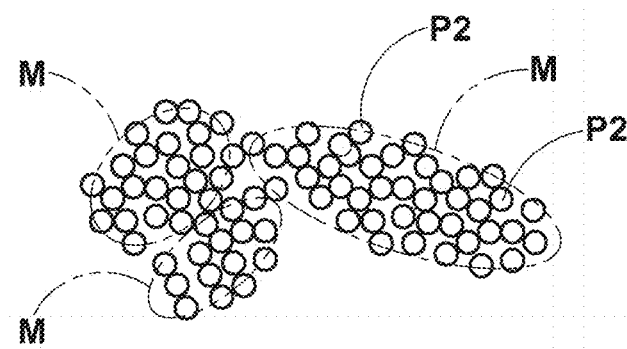
FIG. 14(b) is a diagram showing second virtual particles in an ideal kneaded state contrasted with the actual kneaded state.
Figure 14C:
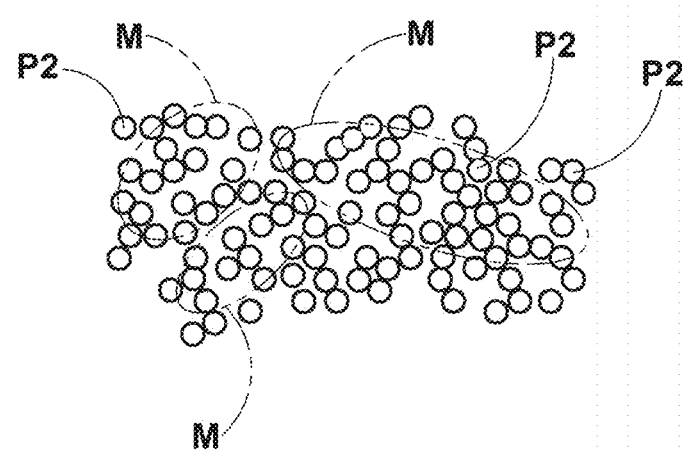
FIG. 14(c) is a diagram showing second virtual particles in an ideal kneaded state obtained by the prior-art simulating method.

In FIGS. 14(a)-14(c), encircled by chain lines are regions in which the fluid model exists.

FIG. 14(a) schematically shows an actual kneaded state at a certain time step obtained in the particle tracking step S5, wherein small white circles indicate the first virtual particles.

FIG. 14(b) schematically shows an ideal kneaded state at the same time step as FIG. 14(a) obtained in the estimating step S6, wherein small white circles indicate the second virtual particles. In the present invention, the degree of coincidence between the first virtual particles and the second virtual particles is calculated.

FIG. 14(c) schematically shows an ideal kneaded state at the time step same as FIG. 14(a) obtained by the prior-art method, wherein small white circles indicate second virtual particles. As shown, regardless of the existence position of the fluid model, the second virtual particles are uniformly distributed. Thus, this ideal kneaded state is incorrect. Accordingly, simulation results obtained by comparing with such ideal kneaded state are not reliable.

Comparison Tests

In order to confirm the advantageous effects of the present invention, a kneading simulation was performed, using the kneading space model shown in FIGS. 3-5 and a fluid model of uncured rubber under the following conditions.

Filling rate of fluid model: 70% and 80% (two kinds of models were used)

Number of rotations of rotative parts (rotors): 30 rpm

Number of first virtual particles: 10,000

Number of second virtual particles: 10,000

Initial positions of first and second virtual particles: in a central portion of the kneading space model Kneading duration time: 20 minutes (actual time)

Figure 15A:
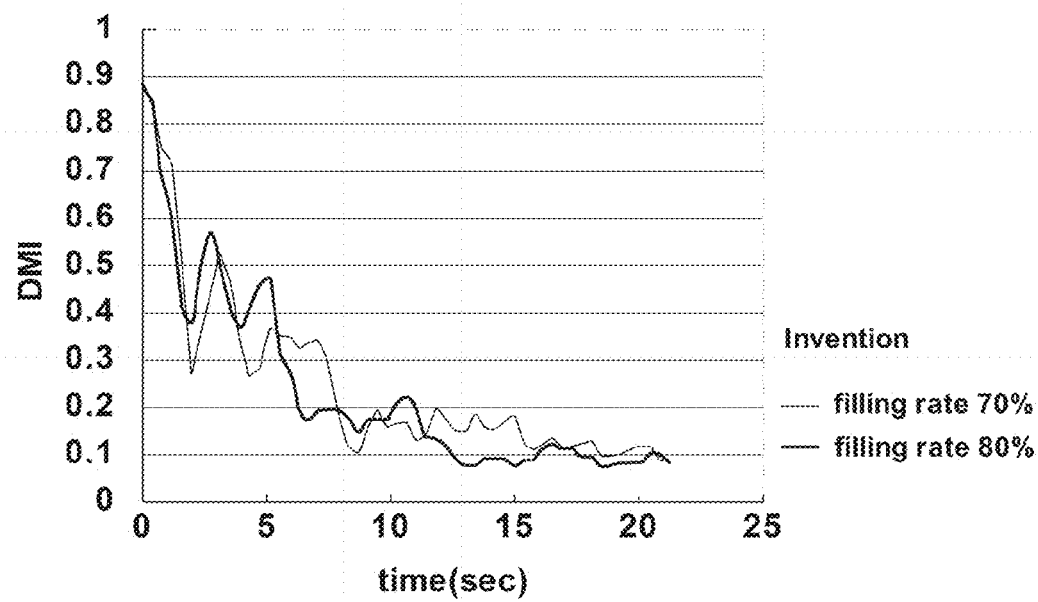
FIG. 15(a) is a graph showing results of the simulating method as an embodiment of the present invention.

FIG. 15(a) shows test results showing the change in the degree of kneading DMI as a function of the elapsed time which were obtained by the method as an embodiment of the present invention.

Figure 15B:
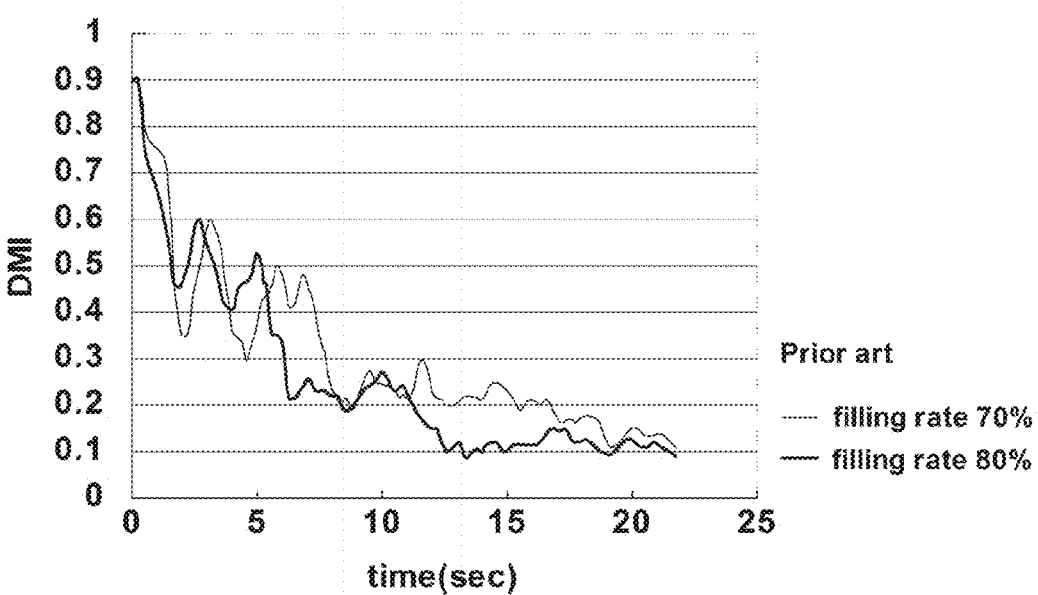
FIG. 15(b) is a graph showing results of the prior-art simulating method.

FIG. 15(b) shows test results showing the change in the degree of kneading DMI as a function of the elapsed time which were obtained by the prior-art method based on the ideal kneaded state defined regardless of the existence position of the fluid model as explained above.

The test results of the prior-art method show a strong tendency that, when the filling rate is low (70%), the DMI value becomes high, namely, the degree of kneading becomes worse.

The test results of the method according to the present invention show that the variations of the DMI values due to the change in the filling rate are relatively small, therefore, the defect of the prior-art method such that the degree of kneading is estimated as being worse in comparison with the actuality when the filling rate is low, can be avoided.

The invention claimed is:

1. A computerized analysis method for estimating a kneaded state of a fluid, comprising the steps of:
   defining a kneading space model which is a three-dimensional finite element model of a kneading space within which the fluid is kneaded;
   defining a fluid model of the fluid;
   defining the fluid model in the kneading space model so as to fill less than 100% of the kneading space and defining necessary kneading conditions;
   tracking a particle tracking, comprising the steps of:
   arranging a plurality of first virtual particles in the kneading space model;
   making a flow calculation of the fluid model based on the kneading conditions;
   tracking the first virtual particles disposed in the fluid model; and
   obtaining positions of the first virtual particles, wherein each first virtual particle is treated as having no dimension and no mass and exerting no influence on the flow calculation of the fluid model and further being movable according to the flow of the fluid model; and
   performing an estimation, comprising the steps of:
   uniformly and fixedly arranging a plurality of second virtual particles in the kneading space model, wherein each second virtual particle is treated as having no dimension and no mass and exerting no influence on the flow calculation;
   calculating fluid positions at which the current fluid model resides from the positions of the first virtual particles in the particle tracking step;
   obtaining positions of the second virtual particles which are uniformly and fixedly arranged and which reside at said fluid positions;
   defining the obtained positions of the second virtual particles as an ideal kneaded state;
   obtaining a degree of coincidence between the obtained positions of the second virtual particles and the positions of the first virtual particles obtained in the particle tracking step;
   defining the obtained degree of coincidence as degree of kneading of the fluid model; and
   developing a kneading machine according to the degree of kneading of the fluid model to perform an actual kneading process.

* * * * *